(12) United States Patent
Cash et al.

(10) Patent No.: US 7,243,845 B2
(45) Date of Patent: Jul. 17, 2007

(54) SYSTEMS AND METHODS FOR EVENT DRIVEN BAGGAGE MANAGEMENT

(75) Inventors: Jerome E. Cash, Carollton, TX (US); Joseph R. Offutt, Grapevine, TX (US); John J. Yourek, Bedford, TX (US)

(73) Assignee: Sabre, Inc., Southlake, TX (US)

( * ) Notice: Subject to any disclaimer, the term of this patent is extended or adjusted under 35 U.S.C. 154(b) by 114 days.

(21) Appl. No.: 10/103,691

(22) Filed: Mar. 25, 2002

(65) Prior Publication Data

US 2002/0134836 A1 Sep. 26, 2002

Related U.S. Application Data

(60) Provisional application No. 60/277,936, filed on Mar. 23, 2001.

(51) Int. Cl.
*G07B 15/02* (2006.01)
(52) U.S. Cl. ...................... 235/384; 235/385
(58) Field of Classification Search ............ 235/375, 235/385, 383, 472.02, 384; 705/5, 22, 28; 209/584, 900
See application file for complete search history.

(56) References Cited

U.S. PATENT DOCUMENTS

| | | | | |
|---|---|---|---|---|
| 3,908,113 A * | 9/1975 | Maxham et al. ............ 235/385 |
| 4,058,217 A * | 11/1977 | Vaughan et al. ............ 209/559 |
| 4,239,434 A * | 12/1980 | Gannon ...................... 700/223 |
| 4,688,026 A * | 8/1987 | Scribner et al. ............ 235/385 |
| 4,776,464 A * | 10/1988 | Miller et al. ............ 235/462.14 |
| 4,832,204 A * | 5/1989 | Handy et al. ................ 209/3.3 |
| 5,225,990 A * | 7/1993 | Bunce et al. ................... 705/5 |
| 5,299,116 A * | 3/1994 | Owens et al. ............... 235/385 |
| 5,311,185 A * | 5/1994 | Hochstein et al. ........... 342/44 |
| 5,313,052 A * | 5/1994 | Watanabe et al. .......... 235/375 |
| 5,478,991 A | 12/1995 | Watanabe et al. |
| 5,537,460 A * | 7/1996 | Holliday et al. ......... 340/539.1 |
| 5,627,517 A * | 5/1997 | Theimer et al. ......... 340/572.1 |
| 5,842,555 A * | 12/1998 | Gannon et al. ............ 198/358 |
| 5,892,441 A * | 4/1999 | Woolley et al. ............ 235/384 |
| 6,014,628 A | 1/2000 | Kovarik, Jr. |
| 6,044,353 A * | 3/2000 | Pugliese, III .............. 235/375 |
| 6,045,652 A | 4/2000 | Tuttle et al. |
| 6,108,636 A * | 8/2000 | Yap et al. ...................... 705/5 |
| 6,222,452 B1 * | 4/2001 | Ahlstrom et al. ........ 340/572.1 |
| 6,229,445 B1 | 5/2001 | Wack |
| 6,462,656 B2 * | 10/2002 | Ulrich et al. ............ 340/539.1 |
| 6,496,568 B1 * | 12/2002 | Nelson ........................ 379/79 |
| 6,512,964 B1 * | 1/2003 | Quackenbush et al. ........ 705/5 |
| 6,523,752 B2 * | 2/2003 | Nishitani et al. ........... 235/375 |

* cited by examiner

*Primary Examiner*—Uyen-Chau N. Le
(74) *Attorney, Agent, or Firm*—Alston & Bird LLP

(57) ABSTRACT

Systems and methods for event driven baggage management are disclosed. Readers are used to detect and monitor the location of tags attached to baggage as the baggage moves from the point at which a traveler drops off the baggage at the origin of a trip to the point at which the traveler picks up the baggage at a destination location. Methods and systems that are capable of detecting when a bag has been lost or misdirected and searching for the lost or misdirected bag are also disclosed. Notification may be sent directly to a traveler or the carrier when specified baggage events occur. Additionally, systems and methods for communicating a destination of an object to a wireless earphone device worn by an object handler are also disclosed.

65 Claims, 10 Drawing Sheets

SYSTEMS AND METHODS FOR EVENT DRIVEN BAGGAGE MANAGEMENT

CROSS REFERENCE TO RELATED APPLICATION

Applicants claim the benefit under 35 U.S.C. § 119(e), based on prior-filed, provisional patent application No. 60/277,936, Filed Mar. 23, 2001, which is relied on and incorporated herein by reference.

DESCRIPTION OF THE INVENTION

1. Field of the Invention

The present invention relates to systems and methods for event driven baggage management.

2. Background of the Invention

Lost or mishandled baggage is an obvious concern for travelers and transportation entities alike. Presently, baggage is recognized as lost or misdirected when a traveler attempts to pick up their baggage at the end of a trip and realizes that the bag is not there. The traveler must then find the appropriate baggage agent, sometimes wait in long lines, and report the bag as missing. Generally, the transportation carrier is first alerted that a bag has been lost when the traveler reports that the particular bag did not arrive along with other bags from the same flight. Following this, an attempt is made to find the bag with little or no information about its whereabouts. The process generally involves attempting to match reports of lost baggage with reports of baggage that has not been claimed. For instance, in one city, a traveler may report a particular bag missing while in another city, baggage agents report having a bag on-hand that has not been claimed by its owner. Eventually, it may be recognized that the missing bag and the on-hand bag are the same. Though the bag may eventually be reunited with the traveler, the process can be extremely time consuming for both the traveler and the transportation carrier.

Therefore, there exists a need for systems and methods that are able to recognize that a bag has been lost or misdirected much earlier and to notify both carriers and travelers of the location of a particular bag at any time to minimize the inconvenience related to lost or misdirected baggage.

SUMMARY OF THE INVENTION

The present invention provides a method for managing objects comprising: associating a tag with an object; providing at least a first and second reader, wherein each reader is capable of detecting the tag; determining a location status of the object based on whether or not the tag is detected by a reader other than the first reader within a predefined period of time.

Additionally, the present invention provides a method for managing objects comprising: associating a tag with a traveler; associating the tag with an object; providing a plurality of readers capable of detecting the tag; determining which readers among the plurality of readers the object is expected to pass; predicting a time for the object to travel to each one of such reader; determining, at the predicted time, whether the tag has been detected by a reader; sending a message to the traveler indicating a location status of the object; and sending a message to a transportation carrier indicating a location status of the object.

Additionally, the present invention provides a system for managing objects comprising: a tag associated with an object; at least a first and second reader capable of detecting the tag, wherein the first and second readers are located along a travel path of the object; a server adapted to determine a location status of the object based on whether or not the tag is detected by a reader other than the first reader within a predefined period of time.

Further, the present invention provides a method for tracking the status of an object, comprising: registering travel information associated with a traveler in a central database, wherein the travel information is associated with an identification tag attached to an object that is associated with the traveler; monitoring the location of the object by detecting when the identification tag passes by one or more checkpoints located between an origin location where the object is dropped off by the traveler, and a destination location where the object is loaded onto a transportation vehicle; and performing a locating process when a central server recognizes that the location tag has not passed through at least one of the one or more checkpoints within a predetermined amount of time, wherein the locating process includes: sending a notification message to the traveler indicating the status of the object's location; and sending a notification message to a transportation agent terminal indicating the status of the object's location.

Additionally, the present invention provides a system for managing the tracking of baggage, comprising: a travel industry site, comprising: one or more checkpoints located between an origination location where one or more objects are accepted from a traveler, and a destination location where the one or more objects accepted from the travelers are intended to be directed to, wherein the one or more checkpoints, origination location and destination location include identification tag detectors for detecting when a identification tag attached to the one or more objects is located within a predetermined distance of the respective detector; a central server including a central database for storing: registration information associated with the traveler and the identification tag attached to the one or more objects, and location information associated with each checkpoint; wherein each of the one or more checkpoints are configured to send location information to the central server for storage into the central database when the respective checkpoint detects the identification tag within a predetermined distance of a location tag detector, and wherein the central server initiates a locating process when it determines that one of the one or more checkpoints do not detect the identification tag within a predetermined amount of time, wherein the locating process includes generating a traveler status message that indicates the status of the location of the one or more objects, and generating a travel industry message that indicates the status of the location of the one or more objects including the last checkpoint the identification tag was detected.

Additional features and advantages of the invention will be set forth in part in the description which follows, and in part will be obvious from the description, or may be learned by practice of the invention.

The accompanying drawings, which are incorporated in and constitute a part of this specification, illustrate embodiments of the invention and together with the description, serve to explain the principles of the invention.

It is to be understood that both the foregoing general description and the following detailed description are exemplary and explanatory only and are not restrictive of the invention, as claimed.

DESCRIPTION OF THE EMBODIMENTS

Reference will now be made in detail to the present embodiments of the invention, examples of which are illustrated in the accompanying drawings. Wherever possible, the same reference numbers will be used throughout the drawings to refer to the same or like components or processes.

Figure 1:
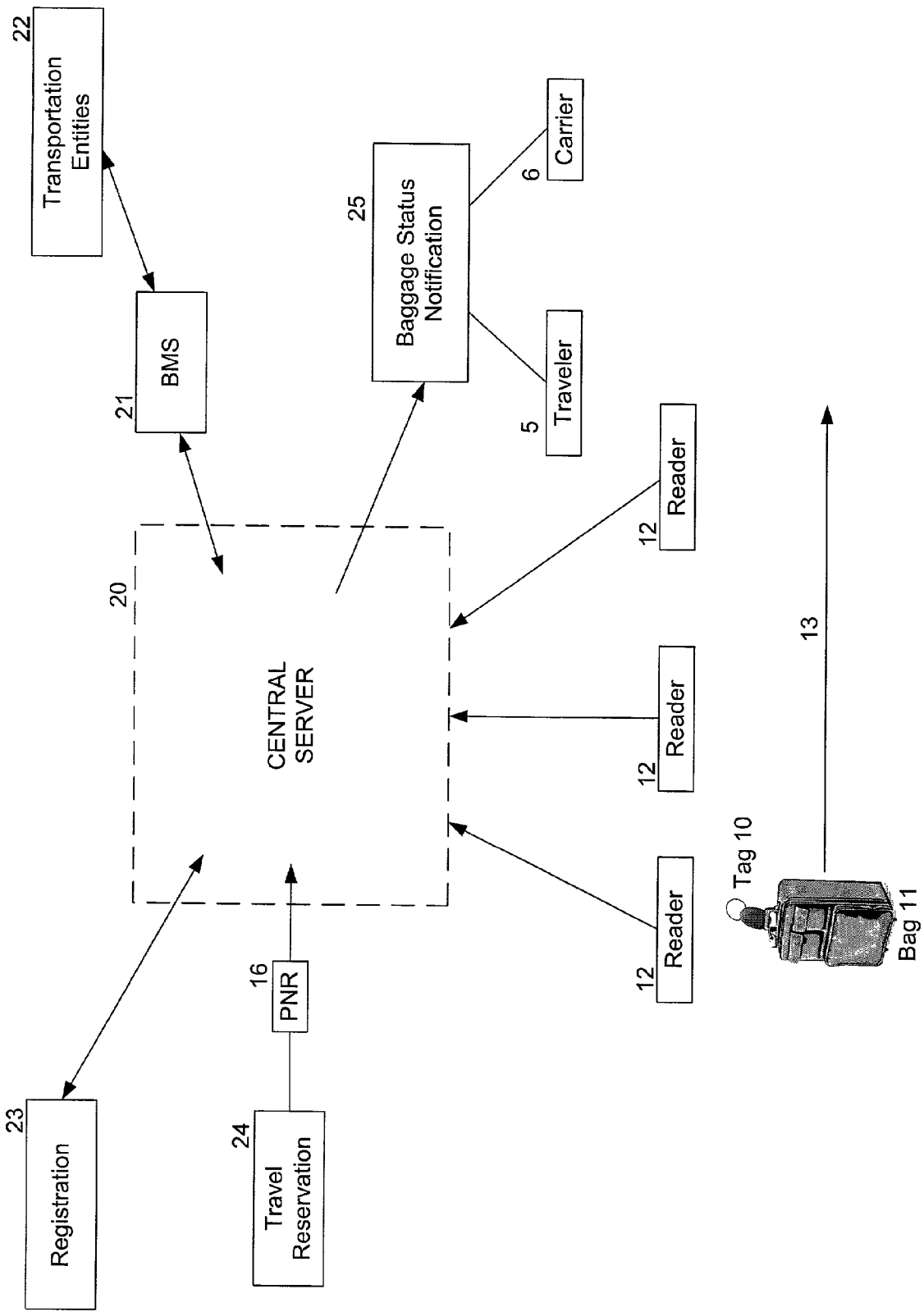
FIG. 1 is a block diagram of a baggage management system according to the present invention.

The present invention is a system and method for event driven baggage management. FIG. 1 is a block diagram of the arrangement of the components and processes of the present invention. The system comprises a baggage tag 10 affixed to or part of a bag 11, two or more readers 12, linked to a central server 20, capable of detecting the presence and identity of the baggage tag 10 as it travels along a path 13. The ability of the readers 12 to detect, identify and report the location a baggage tag 10 to the central server 20 facilitates many of the features of the present invention. The central server 20 has the ability to communicate with a Baggage Management System (BMS) 21 that is linked to various transportation entities 22. The central server 20 can also receive tag registration 23 information, travel reservation 24 information, and send baggage status notification 25 directly to a passenger 5 and to a transportation carrier 6. The details of these components and processes are discussed in greater detail below.

Figure 2:
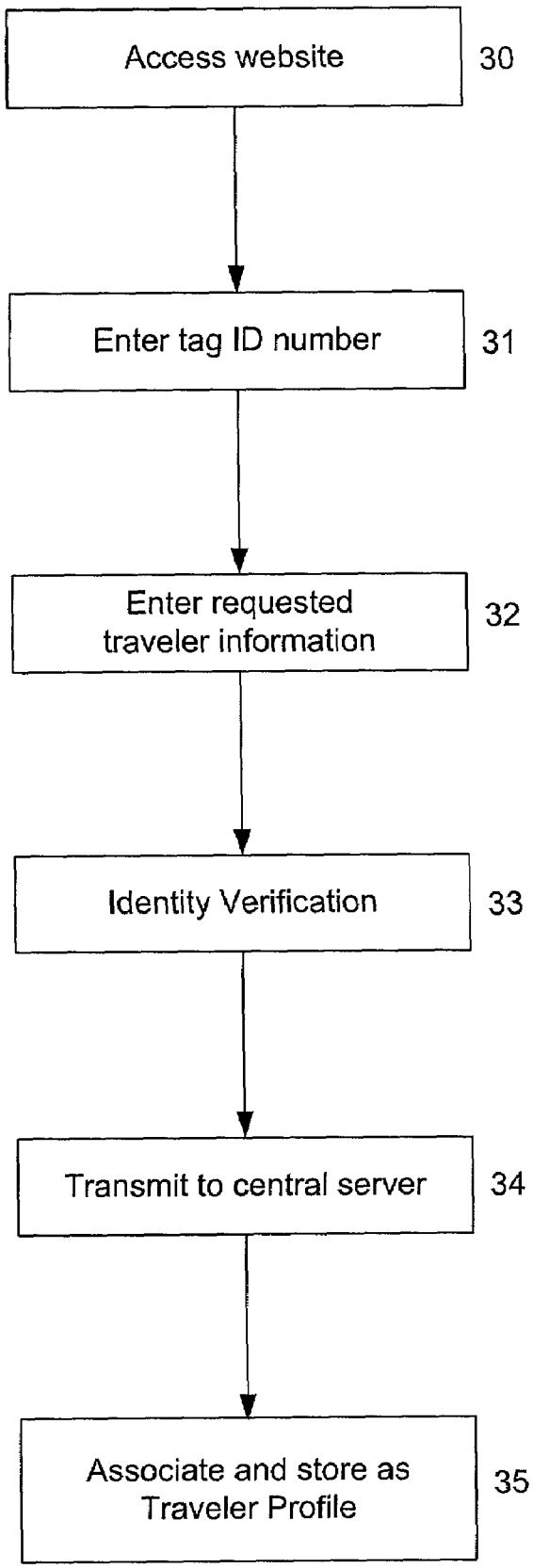
FIG. 2 is a flow diagram of a process of registering a tag at an online website according to the present invention.

The baggage tags 10 of the present invention have a unique numeric identifier that allows the central server 20 to recognize and access information associated with the baggage tag 10. The information associated with the baggage tag 10 is gathered by a registration 23 process. Registration 23 establishes an association in the central server 20 between the unique numeric identifier of a baggage tag 10 and a traveler 5. Registration 23 may occur in a variety of ways, including at a registration office, such as a travel agency or airport, over the phone, or on-line at a website affiliated with a central server as shown in FIG. 2. The traveler accesses the web site (step 30) and enters the baggage tag identifier number (step 31). The traveler then enters the requested traveler information (step 32), including but not limited to first and last name and a phone number or wireless device identifier to which notifications related to baggage location can be sent. Additionally, identity verification may also be requested (step 33). This may require the traveler 5 to provide a biometric identifier such as a voiceprint, iris scan, or fingerprint sample. The registration information is transmitted to a central server 20 (step 34) that associates and stores the identifier number of the tag 10 and traveler information as a traveler profile (step 35).

After registration, the traveler can make travel reservations using a travel website, a travel agent, or other booking entity. When booking travel, the traveler may identify themselves by the tag identifier number, a biometric identifier such as voice print, or by name. The information about the trip is sent to the central server 20 in the form of a passenger name record (PNR) 16 that is then associated with the traveler profile and tag identifier number. The PNR represents information about a particular trip to be taken by the traveler 5. The PNR is configurable and may be used by any number of entities, including airline agents, travel agents, and travel and transportation entities.

During travel, the central server 20 may use a variety of technologies to monitor the location of the baggage tag 10. Examples of location detection technologies that could be used include radio frequency identification (RFID), global positioning satellite (GPS), and bluetooth technologies. Optical location detection technologies, such as barcode tags and barcode readers could also be used. The tags may be externally or internally attached to or affixed baggage or objects, may be an embedded feature of the bag or object or may be placed inside the baggage object.

Though various technologies may be utilized, it is preferable that the location detection technology used in this invention enable a variety of wireless devices to automatically detect and communicate with each other. A location-detection-enabled baggage tag 10 and reader 12 that automatically discovers and identifies the tag 10 and connects and communicates baggage location information to a central server 20 are presently preferred. Such baggage tags 10 and readers 12 may enable embedded RFID and wireless communications technologies such as bluetooth. Bluetooth is an existing wireless communications specification for small form factor, low-cost, short-range radio links between a variety of portable and mobile computing devices. Bluetooth devices operate in the unlicensed, 2.4 GHz radio spectrum using a spread spectrum, frequency hopping, full-duplex signal at up to 1600 hops/sec among 79 frequencies at 1 MHz intervals to give a high degree of interference immunity. However, the baggage tags 10 may be associated with a number of different wireless technologies that enable the baggage tags 10 to be tracked using scanning type devices associated with the baggage tags 10, and are not limited to the above exemplary technologies.

Figure 3:
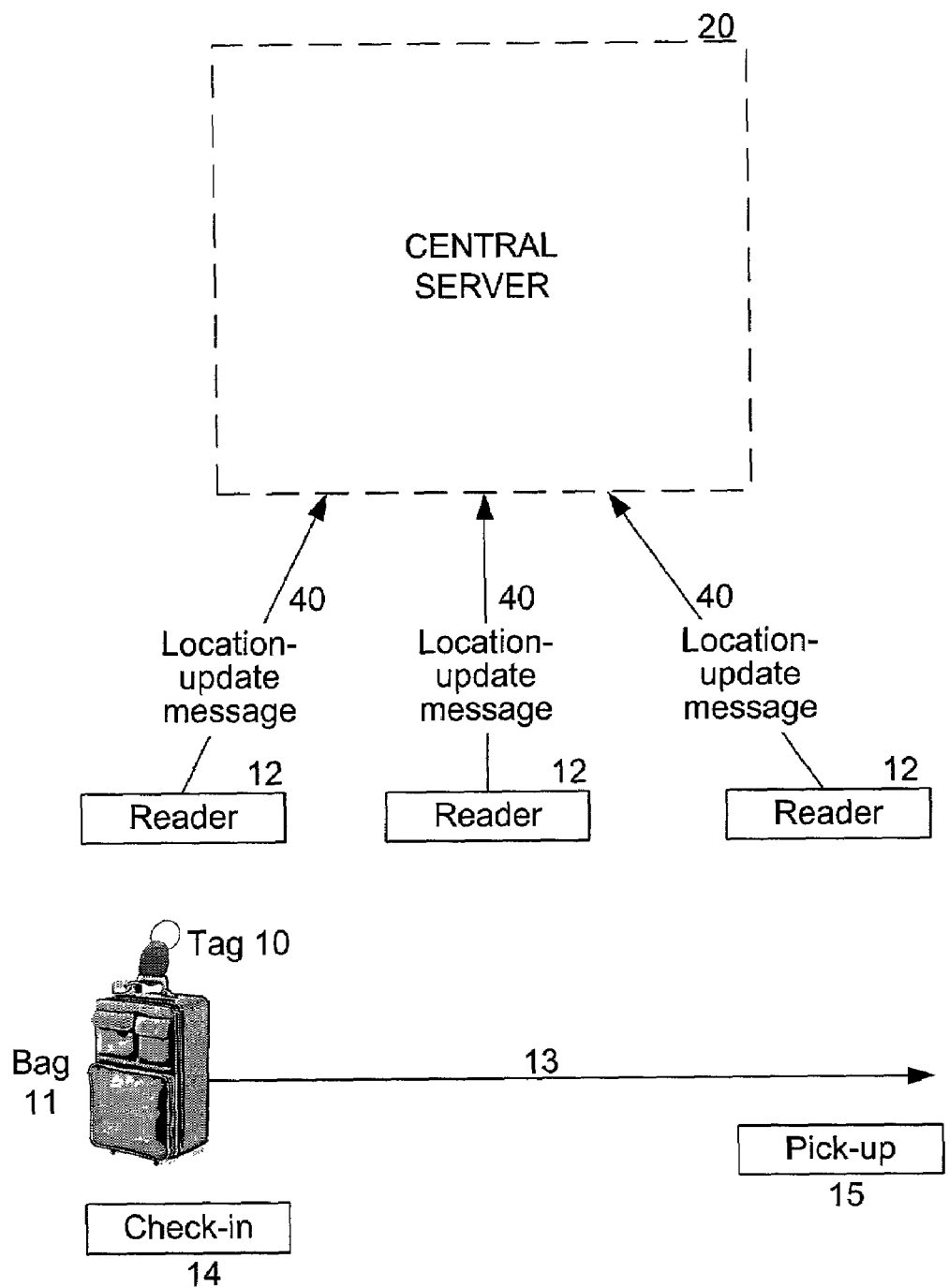
FIG. 3 shows an arrangement of readers along an exemplary expected travel path of a bag and the process of monitoring the location of a bag and tag according to the present invention.

As shown in FIG. 3, a number of location-detection-enabled readers 12 are set up as "check-points" along the baggage travel path 13 from check-in 14 at the origin of the trip to pick-up 15 at the destination end of the trip.

The readers 12 may for instance be placed at check-in counters, at various points along a baggage conveyor system, in baggage carts, with baggage handlers, in the baggage compartments of planes or other transportation vehicles, and at baggage carousels, and exits of baggage claim areas. A baggage tag 10 attached to a bag 11 passes near the readers 12 as it travels along a path 13 from check-in 14 to pickup 15. When a bag 11 with the baggage tag 10 comes near a reader 12, the reader 12 detects and identifies the baggage tag 10. The reader 12 sends a location-update message 40 to the central server 20 indicating the baggage tag identifier number, the location of the reader 12, and the date/time the tag 10 was detected. Baggage location-update messages are sent to the central server 20 each time the bag 11 passes a "check-point" reader 12. The central server 20 stores the location-update messages 40 for each bag. In this way, the bag is tracked from the time it leaves the traveler at check-in 14 until it is back in the hands of the traveler at the final destination pick-up 15.

Figure 4A:
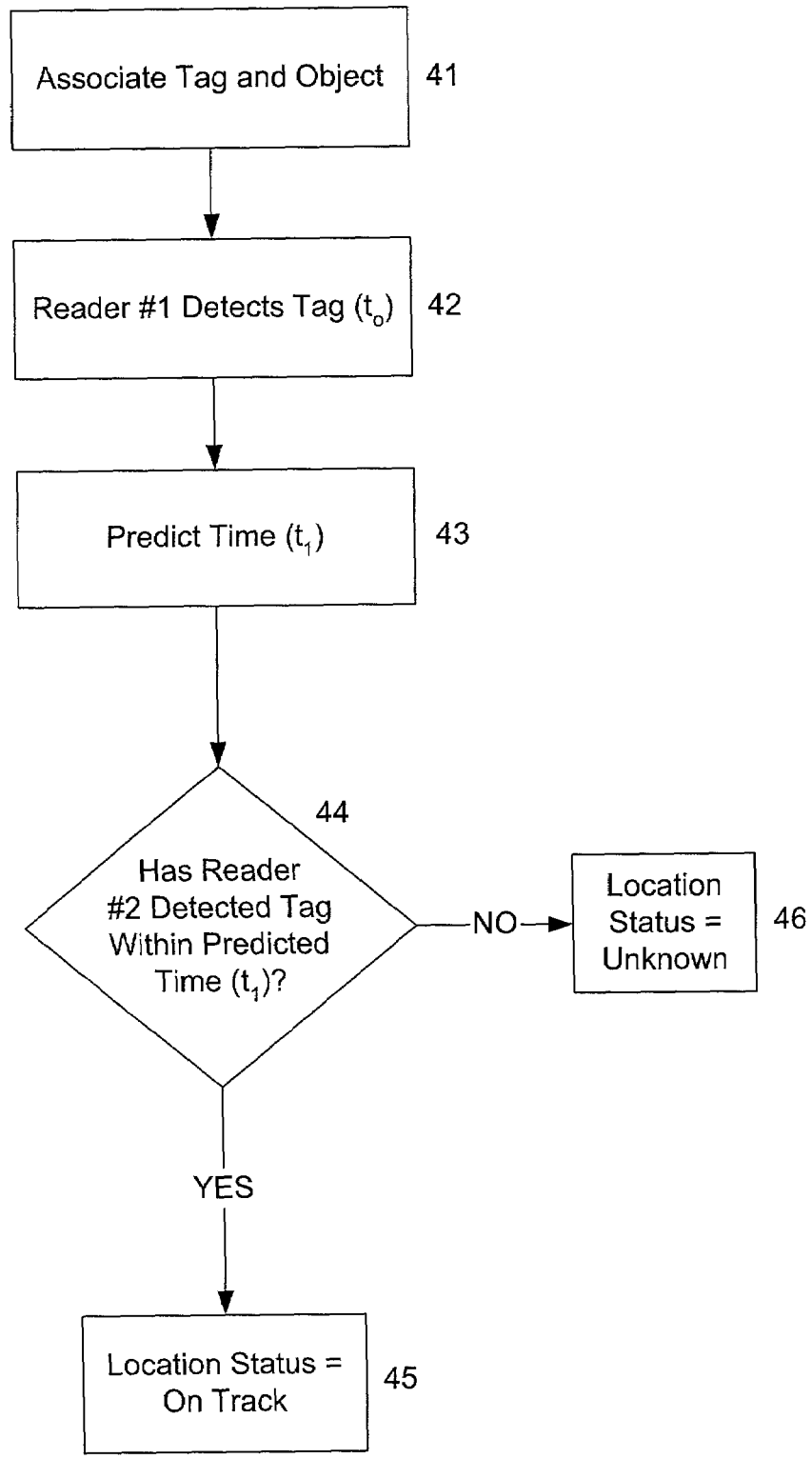
FIG. 4a is a flow diagram of a simplified process of determining a location status of an object, such as a bag, according to the present invention.

In addition to being able to track the location of baggage throughout the transportation process, the system has the ability to determine when a bag has been lost or misdirected. FIG. 4a shows a simplified process of determining a location status of an object, such as a bag according to the present invention. First, the tag is associated with the object (step 41). A first reader detects the tag at time ($t_0$) (step 42). The system predicts a time ($t_1$) for the object to travel from the first reader to a second reader (step 43). At the predicted time ($t_1$), the system determines whether the tag has been detected by the second reader (step 44). If the tag has not been detected, the location status of the object is uncertain (step 46). If the tag has been detected, the location status is on track (step 45).

Figure 4B:
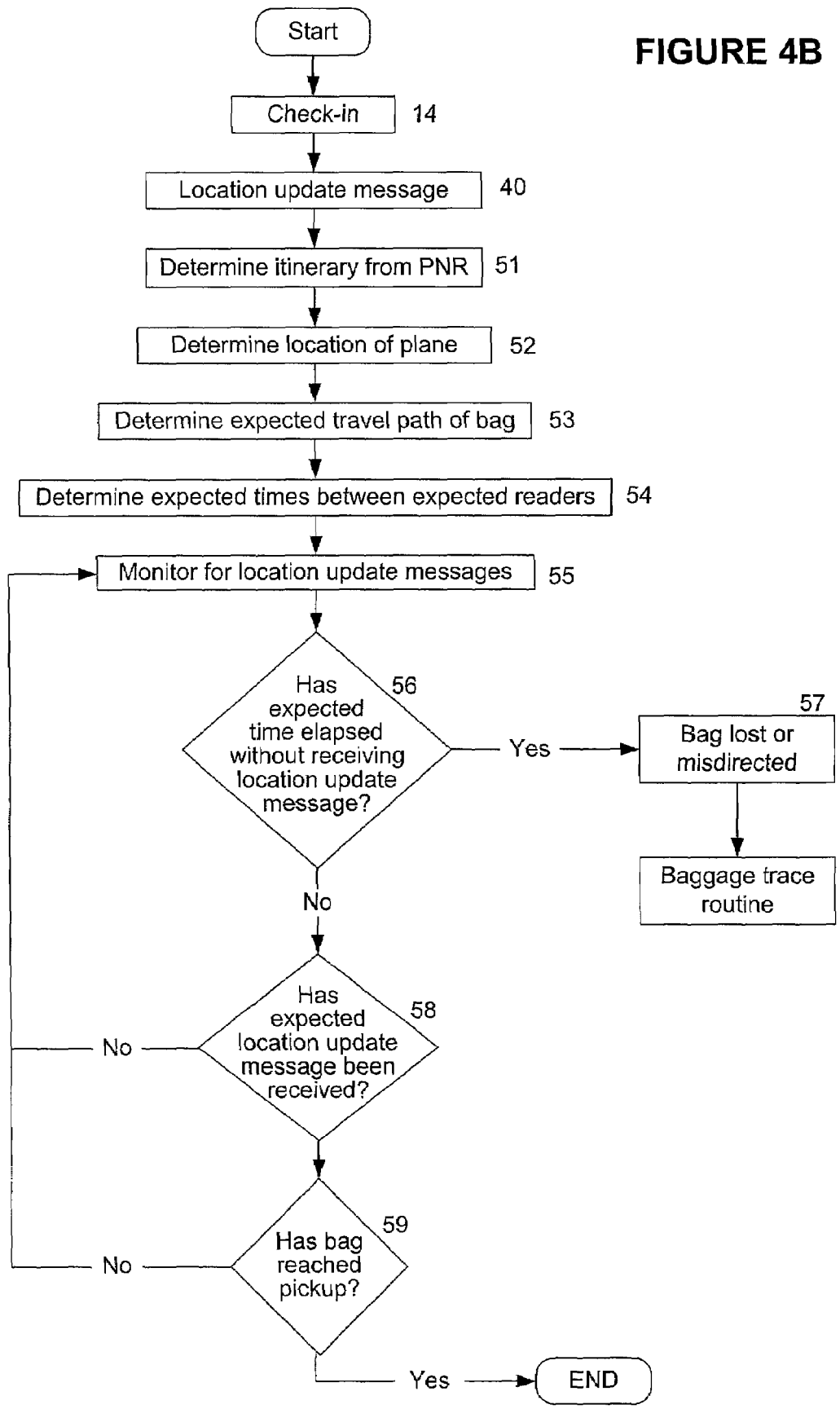
FIG. 4b is a flow diagram of a process of determining a location status of a bag according to the present invention.

FIG. 4b shows in greater detail a process of determining a location status of an object, such as a bag according to the present invention. At check-in (step 14), a reader 12 detects the baggage tag 10 and sends a location-update message 40 to the central server 20 (step 40). Then, the central server 20 determines the itinerary of the traveler from the PNR 16 associated with the tag 10 (step 50). The central server 20 determines the location of the plane on which the passenger 5 and the bag 11 will be traveling (step 51) by interfacing with a Departure Control System (DCS). The DCS is an existing system that manages the flow of departing flights, travelers, and baggage. The DCS, among other things, maintains information about the location of departing planes. The central server 20 uses the location of the departing plane and the check-in location along with airport specific baggage transit configurations to determine an expected travel path 13 in the form of a series of readers 12 the particular bag is expected to pass (step 52). Also using the airport specific baggage transit configurations, the central server 20 determines times at which the bag 11 is expected to pass each specified reader 12 (step 53). For example, the central server may include a table that shows an acceptable time period for a bag to flow from a first location such as a particular check-in station to a second location such as the loading compartment of an airplane. The table may also include baggage transit time information for every possible combination of first and second locations. After determining an expected bag travel path (step 52) and determining expected times between readers (step 53), the central server 20 monitors for location-update messages 40 (step 54). The central server 20 determines whether the expected time has elapsed without receiving a location-update message (55). If the expected time has elapsed without receiving a location-update message, the bag is determined to be lost or misdirected (step 56) and the central server 20 initiates a baggage trace routine (step 60). If the expected time has not elapsed, the central server 20 determines whether the expected location-update message has been received (step 57). If not, the central server 20 continues to monitor for location-update messages (step 54). If an expected location-update has been received within the expected time, the central server 20 determines whether the bag has reached the pick-up area at the destination (step 58).

This may be done by determining whether a location-update message has been received from the last reader 12 on the expected travel path 13. The last reader may be on a baggage carousel in baggage claim or may be at the exit of the baggage claim area. If the bag has reached its final destination and been picked up by its owner, the process ends. If the bag has not reached its final destination, the central server 20 continues to monitor for the next expected location-update message (step 54). Similarly, though not shown in FIG. 4b, if the central server 20 receives a location-update message 40 from a reader 12 that is not located on the expected travel path 13 of the bag, the system recognizes that the bag has been misdirected. In response to a bag lost or misdirected determination, the central server 20 automatically initiates the baggage tracer routine (step 60).

Figure 5:
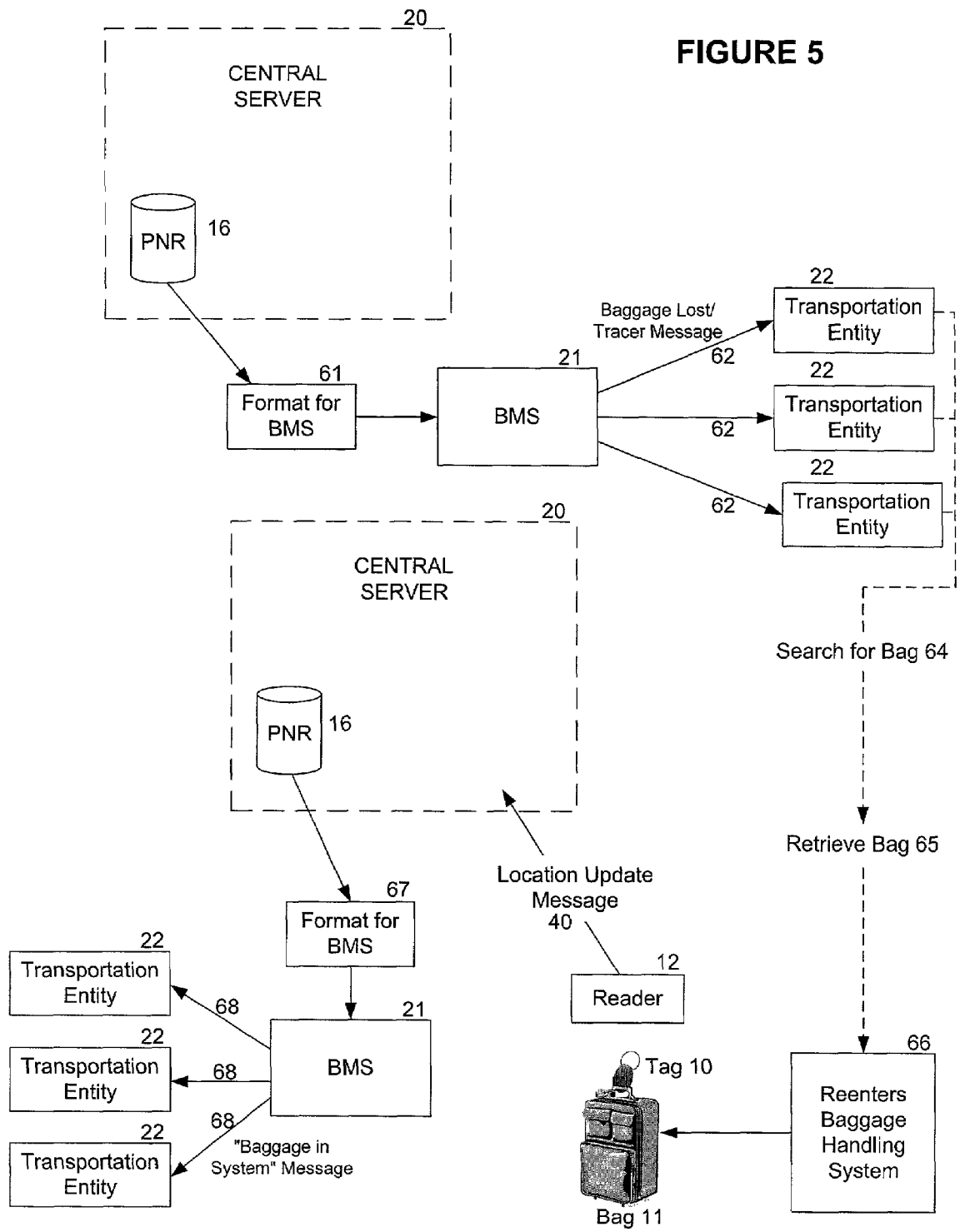
FIG. 5 is a flow diagram of a baggage tracer routine according to the present invention.

Once a bag is determined not to be where it was expected, the central server 20 initiates a baggage tracer routine (step 60), as shown in FIG. 5. The central server 20 interfaces with the BMS 21 to perform a tracer routine once the central server 20 determines that baggage associated with a traveler is lost or misdirected. The BMS refers to existing travel industry systems that manage checked baggage. BMSs typically issue temporary identification numbers to each bag. If a bag is reported lost, found, damaged, stolen, etc. an entry can be entered into the BMS and shared with relevant travel industry entities through a plurality of user terminals throughout the travel industry. The present invention utilizes this existing system to alert travel industry entities to facilitate finding a lost or misdirected bag. The central server 20 preferably interfaces with the BMS 21 using a J2EE-compliant (Java 2 Enterprise Edition) interface via a WAP (Wireless Application Protocol) gateway platform. The interface is sufficiently generic to allow the central server 20 to interface with a variety of different BMSs. The BMS 21 communicates with transportation entities 22, such as airlines, to facilitate a search for a lost baggage by automatically taking information from the PNR 16 associated with the lost or misdirected bag 11 in the central server 20 and formatting the information (step 61) into a "baggage lost/tracer" message 62 for the BMS 21. The message may include the name of the passenger, the baggage tag identifier number, carrier, flight, date, origin, destination and the last known location of the bag. The BMS 21 alerts the appropriate transportation entities 22 that the particular bag has been lost by transmitting the "baggage lost/tracer" message 62. The transportation entities 22 then search for (step 64) and retrieve the bag (step 65) assisted by information of the bag's last detected location. When the bag 11 is found, it reenters the baggage handling system (step 66) and its location is established by a location-update message 40 from the first encountered reader 12 in the baggage handling system. In response to this location-update message 40, the central server 20 takes information from the PNR 16 in the central server 20 and formats the information (step 67) into a "baggage in system" message 68 for the BMS 21. The message may include the name of the passenger, the baggage tag identifier number, carrier, flight, date, origin, and destination. The "baggage in system" message 68 is transmitted to appropriate entities 22, alerting them that the bag has been located, while simultaneously canceling the previous baggage lost/tracer message 62.

Figure 6:
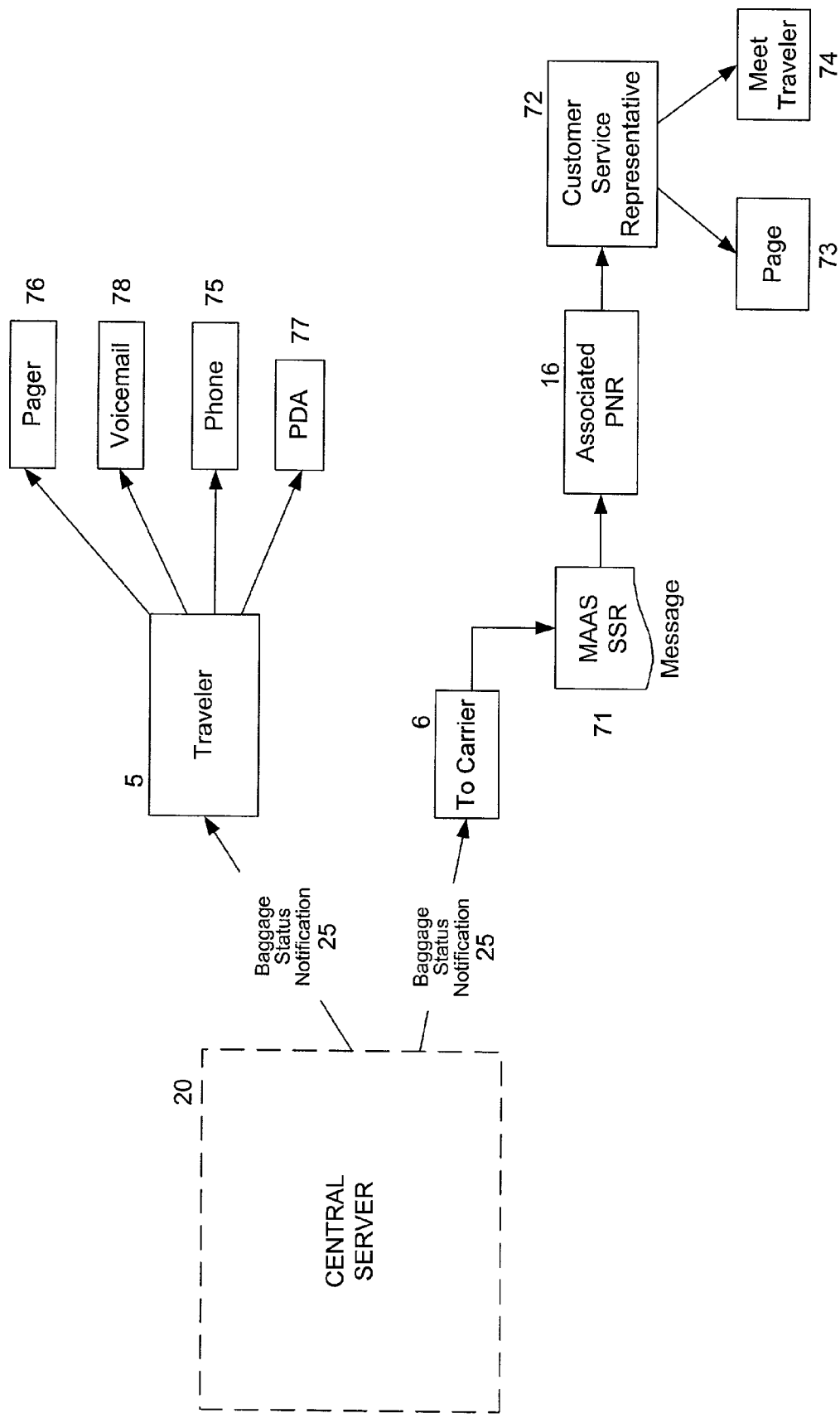
FIG. 6 is a block diagram illustrating notification of a passenger and carrier of a specified baggage event according to the present invention.

FIG. 6 shows that in addition to tracking baggage location and facilitating quickly finding lost and misdirected baggage, the present invention provides proactive customer service by providing a baggage status notification 25 to travelers 5 and transportation entities, such as carriers 6, when specified baggage events occur. Such baggage events may include a determination that the bag is lost or misdirected, baggage has been found, or that baggage has arrived at a specified location. When specified baggage events occur, the central server 20 sends a baggage status notification 25 to a carrier 6 by creating a meet and assist (MAAS) special service request (SSR) message 71 in PNR 16 associated with the relevant bag. A customer service representative 72 may be notified of the update to the PNR and page 73 or meet 74 the arriving passenger and personally communicate the baggage status notification 25. The message may include the bag number, a description of the baggage handling event, such as baggage delayed, when and where the baggage will arrive, and where the traveler can pick up compensation to minimize the inconvenience of the delayed baggage.

FIG. 6 also shows that the central server 20 may also provide a baggage status notification 25 directly to a traveler 5. Contact information is retrieved from the traveler profile or PNR 16 associated with the tag 10. This information is used to send baggage status notification 25 to the passenger's designated wireless device such as mobile phone 75, pager 76, personal data assistant (PDA) 77, or voicemail 78. The notification 25 could be a text message or a voice message generated by a text-to-speech translator. The message could include an apology or appeasement message containing the bag number, a description of the baggage handling event, such as baggage delayed, when and where the baggage will arrive, and where the traveler may pick up compensation to minimize the inconvenience of the delayed baggage.

The following example illustrates the operation of some aspects of the present invention.

Figure 7:
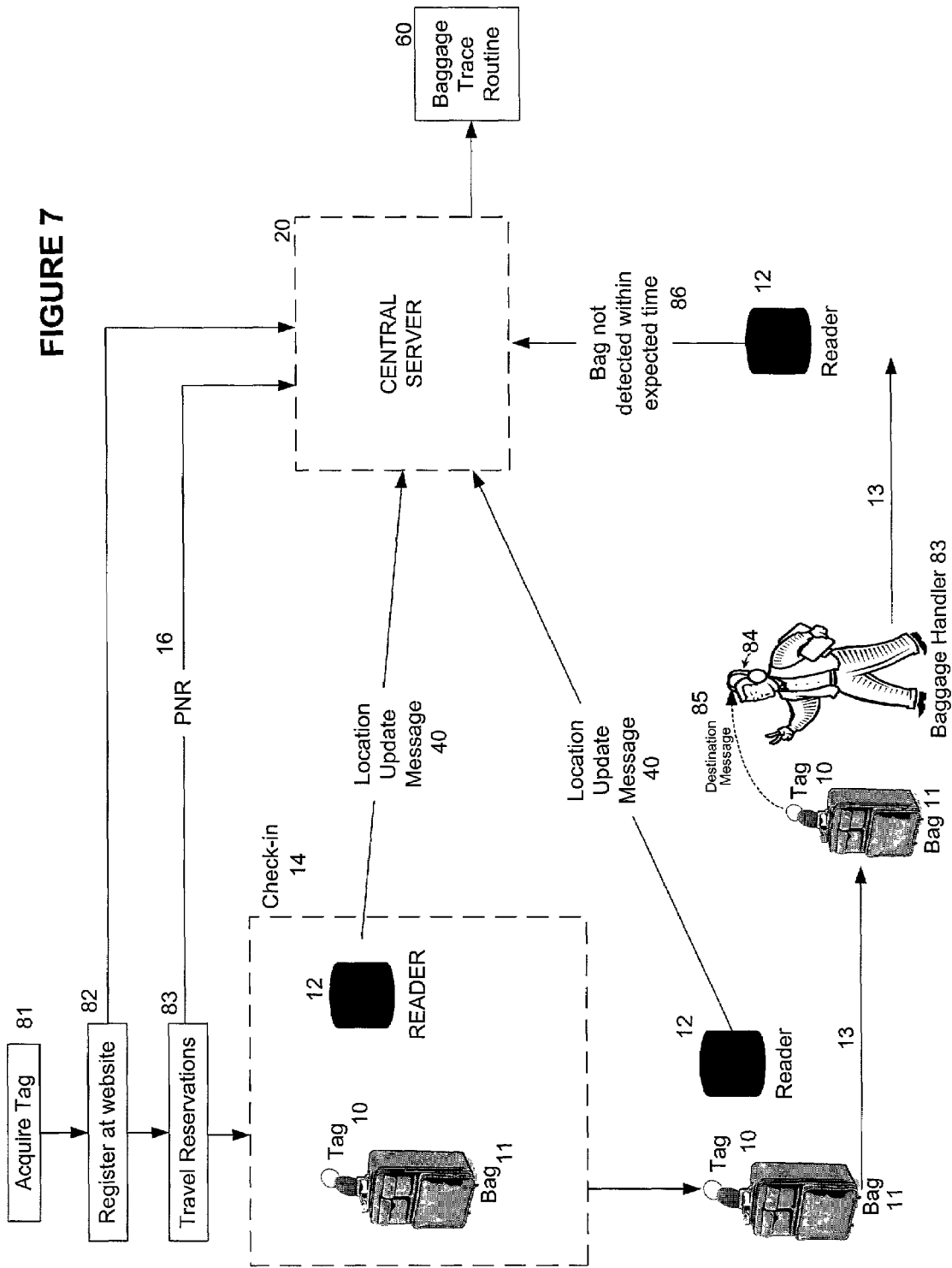
FIG. 7 is a block diagram of a baggage management system with an example illustrating certain features according to the present invention.

As shown in FIG. 7, the traveler acquires a baggage tag 10 (step 81) that enables embedded RFID and wireless communications technologies. The traveler registers the tag 10 by accessing a website associated with the central server 20 (step 82). Information about the traveler, including name and mobile telephone number, is entered into the website. Additionally, the traveler may be required to provide a biometric identifier such as a voice print. This information is transmitted to the central server 20 where it is associated with the unique numeric tag identifier and stored as a traveler profile. After registration, travel reservations can be made through a travel website, a travel agent, or other method using the tag identifier number, a biometric identifier such as voice print, or name to identify the traveler (step 83). The information about the trip is sent to the central server 20 as a PNR 16 that is then associated with the traveler profile and tag identifier number.

On the day of travel, a wireless bag tag reader 12 at an airport check-in 14 counter automatically detects the tag 10 and communicates the check-in location and tag identifier number to the central server 20 in a location update message 40. The traveler may then be required to supply a voice print or other biometric identifier to verify that the traveler 5 is the person to whom the tag 10 has been registered. If the biometric identifier matches the sample stored in the traveler profile, the central server 20 determines the itinerary of the traveler from the appropriate PNR 16 associated with the tag 10. Based on the check-in location and destination, the central server 20 determines an expected path 13 of travel for the bag and the series of readers 12 near which the bag 11 will pass. The central server 20 also calculates the expected time for the bag 11 to travel between consecutive readers 12.

Once the bag 11 has been checked, additional wireless readers 12 track it at various checkpoints along the path from check in, to the aircraft, and back to the baggage claim area. Each reader 12 sends a location-update message 40 to the central server 20 when it detects the baggage tag 10 attached to the bag. The central server 20 records each location-update message 40.

When a bag is handled by a baggage handling agent 83, the wireless communications capability of the tag 10 automatically detects and connects with wireless earphones 84 worn by the baggage handling agent 83. The baggage tag 10 transmits a destination message 85 of the bag 11, causing a text-to-speech module, preferably located in the earphones 84, to speak the intended final destination to the agent 83. This reminds the agent 83 of the destination of the bag 11 and avoids mishandlings normally attributable to fatigue.

Figure 8:
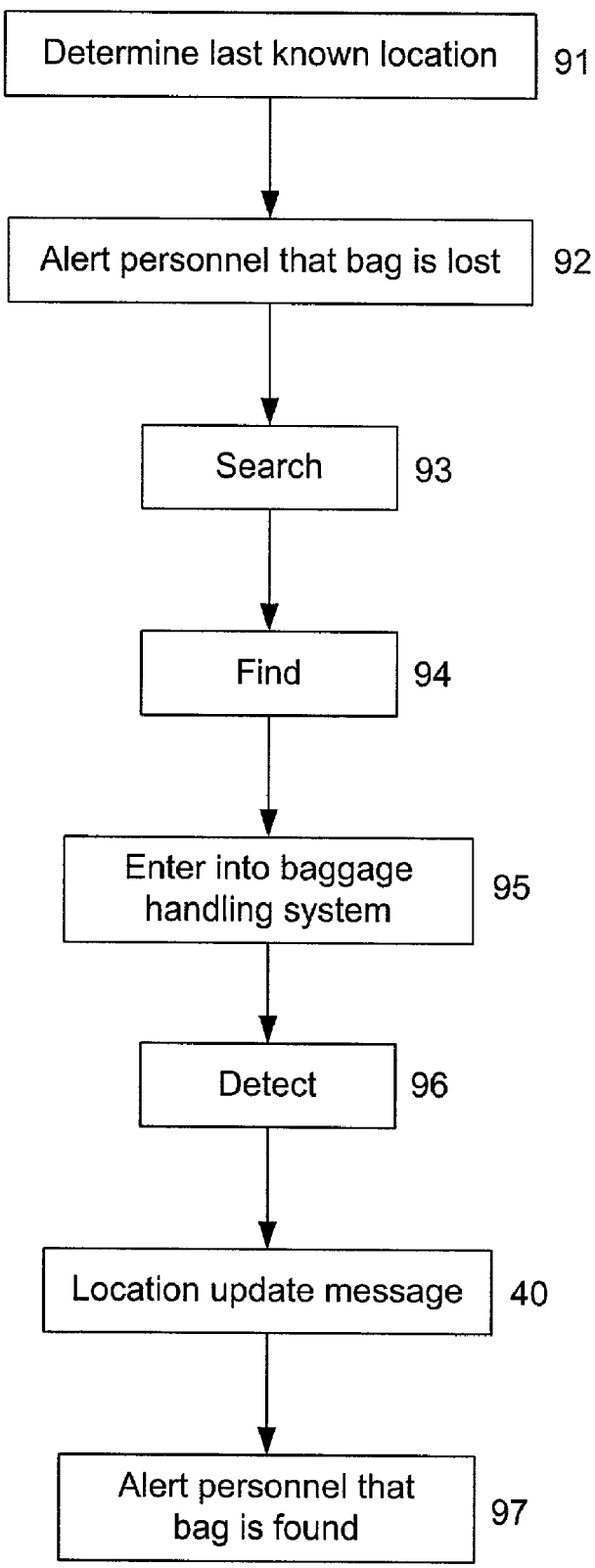
FIG. 8 shows a tracer routine used in the example of FIG. 7.

If the bag 11 and attached tag 10 is not detected within the expected time (step 86) or a location-update message is received from an unexpected reader 12, the central server 20 initiates a baggage tracer routine (step 60). As shown in FIG. 8, the tracer routine 60 determines the last known location of the bag 11 (step 91) and alerts travel industry personnel anywhere in the world that the bag is not where it should be (step 92). The personnel search for (step 93) and find the bag 11 (step 94), and reenter it into the baggage handling system (step 95) where a reader 12 detects the tag 10 (step 96) and sends a location-update message (step 40). The central server 20 alerts travel industry personnel that the bag is found and enroute to the destination specified in the associated PNR (step 97).

Figure 9:
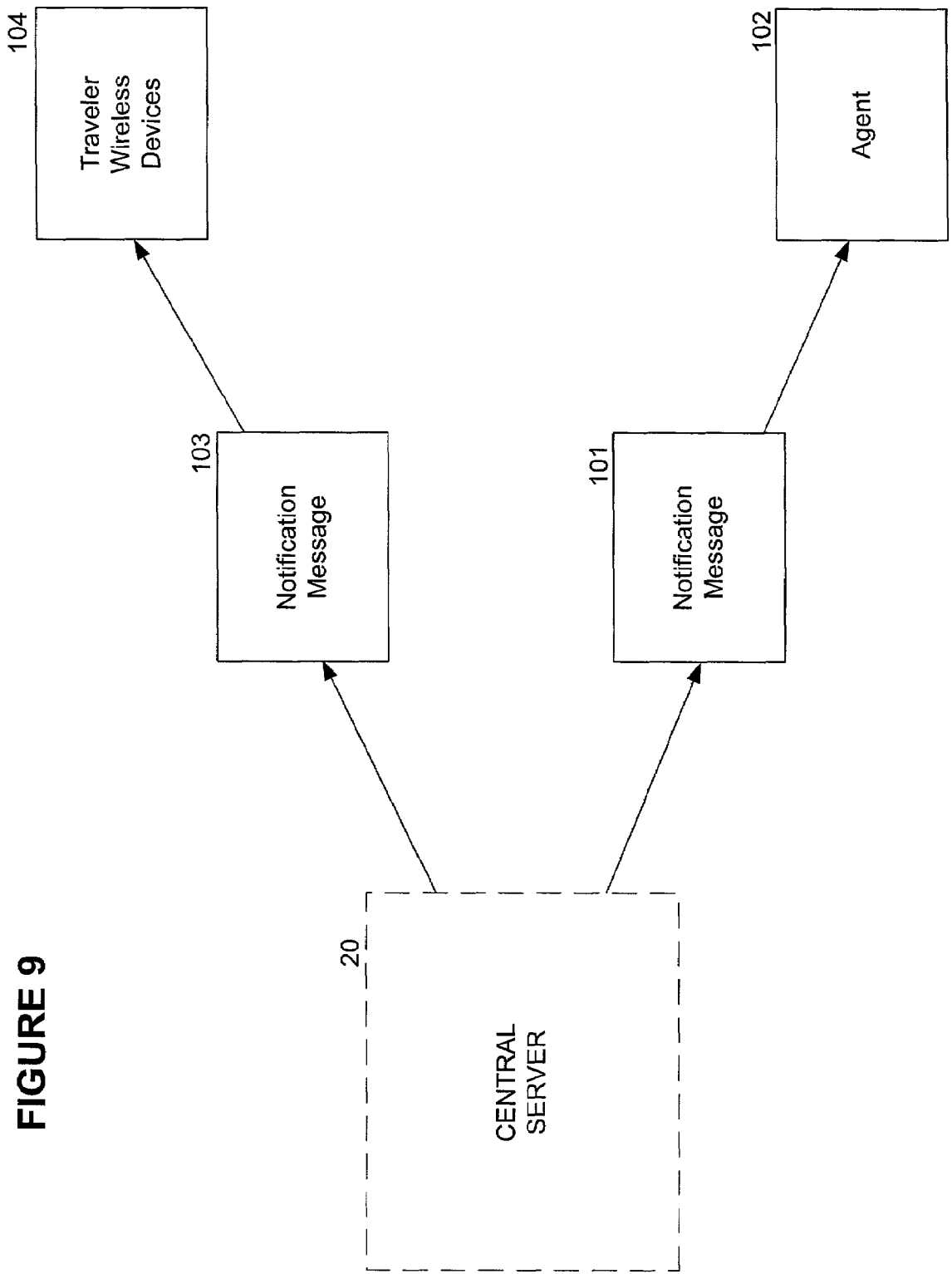
FIG. 9 shows a notification process used in the example of FIG. 7.

As shown in FIG. 9, when a bag 11 has been delayed and will not arrive on the same flight as the traveler, baggage agents at downline airports can be notified that a delayed bag is on its way. The central server 20 sends a message 101 that notifies an agent 102 at the traveler's destination to meet the passenger and notify the traveler that the bag has been delayed. The traveler may also receive a message 103 via the traveler's wireless devices 104, that the bag has been delayed, that the bag will be arriving at a specified time on a specified flight, where the bag will arrive, and where the traveler may pick up compensation for any inconvenience. For example, the verbal or text message 103 may state: "This is a message from (carrier) Baggage Services to (name): your bag number (bag number) has been delayed but will be arriving at (destination airport) at (arrival time) on (carrier) (flight). A pre-paid debit card awaits you at gate (current arrival gate), compliments of (carrier) to help minimize the inconvenience until . . . " The traveler may be notified again by the same methods when the baggage arrives at the destination.

As described, systems and methods consistent with the present invention provide services that may reduce the costs to both airlines and travelers from lost baggage. These value-added services may motivate travelers to purchase their own bag tags 10, for either external attachment to their current baggage or as an embedded feature of their next baggage purchase. Through the implementation of methods and systems of the present invention, the check-in process at airline terminals may be made faster and more efficient and possibly be made self-servicing by the traveler, resulting in additional airline cost savings and traveler convenience.

In addition to the above mentioned benefits, the bag tags 10 are reusable; there are value-added services for both travelers and airlines; and the bag tags 10 may be branded or offered as 'perks' by travel suppliers and agencies to valued customers. Value-added services may include: faster baggage check-in, possibly self-servicing (no need to generate and attach today's paper bag tags 10); earlier detection of baggage mishandlings and routing errors (enabling airlines to take corrective measures earlier and provide better customer service); notification to a variety of wireless handheld devices when a bag has arrived for pick-up at the carousel or that a bag has been delayed along with an appropriate customer service and/or appeasement message; alerts when a bag has moved outside of a predefined configurable distance from its owner, thereby reducing theft; on-demand baggage tracking via a wireless or web interface; on-demand baggage scanning to determine the owner of an abandoned bag (to avoid today's default procedure of treating the bag as a dangerous and/or explosive device) or to quickly locate bags to be removed from an aircraft when the passenger is not onboard (to improve airline on time performance); more accurate, dependable knowledge of a bag's location, thus enabling airlines to verify that a bag did arrive as intended to challenge fraudulent claims of lost bags.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for managing objects comprising:
   associating a tag with an object;
   providing at least a first and second reader, wherein each reader is configured for detecting the tag;
   determining a location status of the object based on whether or not the tag is detected by a reader other than the first reader within a predefined period of time; and
   providing a server configured for automatically initiating a tracer routine to locate the object if the tag is not detected by the reader other than the first reader within the predefined period of time, wherein the server is configured for interfacing with at least one baggage management system for performing the tracer routine, and wherein the server is further configured for sending a message to a communication device associated with a traveler when a specified event occurs.

2. The method for managing objects of claim 1, wherein the object is an article of baggage.

3. The method for managing objects of claim 1, wherein the tag is a wireless device configured for detecting and communicating with other devices.

4. The method for managing objects of claim 3, wherein the tag is configured for detecting and communicating a destination message to a wireless device held or worn by a handling agent.

5. The method for managing objects of claim 4, wherein the wireless device is an earphone configured for receiving the destination message.

6. The method for managing objects of claim 1, wherein the tag comprises radio frequency identification and wireless communication technologies.

7. The method for managing objects of claim 1, wherein the tag is configured for detecting and communicating with each reader.

8. The method for managing objects of claim 1, wherein the tag is associated with a traveler by a registration process.

9. The method for managing objects of claim 8, wherein the registration process comprises registering on-line at a website.

10. The method for managing objects of claim 8, wherein the registration process comprises collecting a biometric identifier of the traveler.

11. The method for managing objects of claim 1, further comprising determining an expected travel path of the object in consideration of airport specific baggage transit configurations.

12. The method for managing objects of claim 11, further comprising determining the object is misdirected if the tag is detected by a reader not located along the expected travel path.

13. The method for managing objects of claim 1, wherein the predefined time is a predicted time for the tag to travel to a reader other than the first reader.

14. The method for managing objects of claim 13, wherein the predefined time is determined in consideration of airport specific baggage transit configurations.

15. The method for managing objects of claim 1, wherein the tracer routine comprises notifying at least one transportation entity that the tag was not detected by the reader other than the first reader within the predefined period of time and providing the last-detected location of the tag.

16. The method for managing objects of claim 15, wherein the tracer routine further comprises notifying at least one transportation entity when the object has been located.

17. The method for managing objects of claim 1, wherein the specified event is a failure to detect the tag within the predefined period of time.

18. The method for managing objects of claim 1, wherein the specified event is locating the tag after a failure to detect the tag within the predefined period of time.

19. The method for managing objects of claim 1, wherein the specified event is detection of the tag by a specified reader.

20. The method for managing objects of claim 1, wherein the message comprises the location status of the object.

21. The method for managing objects of claim 1 further comprising sending a message to a transportation carrier when a specified event occurs.

22. The method for managing objects of claim 21, wherein the specified event is a failure of a reader to detect the tag within the predefined period of time.

23. The method for managing objects of claim 21, wherein the specified event is locating the tag after a failure to detect the tag within the predefined period of time.

24. The method for managing objects of claim 21, wherein the specified event is the detection of the tag by a specified reader.

25. The method for managing objects of claim 21, further comprising a representative of the transportation carrier conveying the location status of the object to the traveler.

26. The method for managing objects of claim 1, wherein the server is configured for notifying the baggage management system when the tag has been located.

27. The method for managing objects of claim 1, wherein the least one baggage management system is configured for communicating with at least one transportation entity to facilitate locating the tag.

28. A method for managing objects comprising:
   associating a tag with a traveler;
   associating the tag with an object;
   providing a plurality of readers configured for detecting the tag;
   predicting a time for the object to travel to each such reader;
   determining, at the predicted time, whether the tag has been detected by a respective reader;

providing a server configured for:
  automatically initiating a locating process when the central server determines that one or more of the readers do not detect the tag within the predicted time;
  sending a message to a traveler indicating the location status of the object when a specified event occurs; and
  sending a message to a transportation carrier indicating the location status of the object when the specified event occurs.

29. The method for managing objects of claim 28, further comprising determining the last detected location of the object and notifying a transportation entity of the last detected location, provided that the tag was not detected by a subsequent reader within the predicted time.

30. The method for managing objects of claim 28, wherein the specified event is a failure to detect the tag within a predefined period of time.

31. The method for managing objects of claim 28, wherein the specified event is locating the tag after a failure to detect the tag within a predefined period of time.

32. The method for managing objects of claim 28, wherein the specified event is detection of the tag by a specified reader.

33. The method for managing objects of claim 28, wherein sending the message to a traveler includes sending the message to a communication device associated with the traveler when the specified event occurs.

34. A system for managing objects comprising:
  a tag associated with an object;
  at least a first and second reader configured for detecting the tag, wherein the first and second readers are located along a travel path of the object;
  a server adapted to determine a location status of the object based on whether or not the tag is detected by a reader other than the first reader within a predefined period of time, wherein the server is configured for automatically initiating a tracer routine to locate the object if the tag is not detected by the reader other than the first reader within the predefined period of time, wherein the server is configured for interfacing with at least one baggage management system for performing the tracer routine, and wherein the server is adapted to send a message to a communication device associated with the traveler when a specified event occurs.

35. The system for managing objects of claim 34, wherein the object is an article of baggage.

36. The system for managing objects of claim 34, wherein the tag is a wireless device configured for detecting and communicating with other devices.

37. The system for managing objects of claim 36, wherein the tag is configured for detecting and communicating a destination message to a wireless device held or worn by a handling agent.

38. The system for managing objects of claim 37, wherein the wireless device is an earphone configured for receiving the destination message from the tag.

39. The system for managing objects of claim 34, wherein the tag comprises radio frequency identification and wireless communications technologies.

40. The system for managing objects of claim 34, wherein the tag is configured for detecting and communicating with the each reader.

41. The system for managing objects of claim 34, wherein the tag is associated with a traveler by a registration process.

42. The system for managing objects of claim 41, wherein the registration process comprises registering on-line at a website.

43. The system for managing objects of claim 41, wherein the registration process comprises collecting a biometric identifier of the traveler.

44. The system for managing objects of claim 34, wherein the server is adapted to determine an expected travel path of the object in consideration of airport specific baggage transit configurations.

45. The system for managing objects of claim 44, wherein the server is adapted to recognize the object is misdirected if the tag is detected by a reader not located along the expected travel path.

46. The system for managing objects of claim 34, wherein the predefined time is a predicted time for the tag to travel to a reader other than the first reader.

47. The system for managing objects of claim 46, wherein the predefined time is determined in consideration of airport specific baggage transit configurations.

48. The system for managing objects of claim 34, wherein the tracer routine comprises notifying at least one transportation entity that the tag was not detected by a reader other than the first reader within a predefined period of time and providing the last-detected location of the tag.

49. The system for managing objects of claim 48, wherein the tracer routine further comprises notifying specified transportation entities when the object has been located.

50. The system for managing objects of claim 34, wherein the specified event is a failure to detect the tag within a predefined period of time.

51. The system for managing objects of claim 34, wherein the specified event is locating the tag after a failure to detect the tag within a predefined period of time.

52. The system for managing objects of claim 34, wherein the specified event is detection of the tag by a specified reader.

53. The system for managing objects of claim 34, wherein the message comprises a location status of the object.

54. The system for managing objects of claim 34, wherein the server is adapted to send a message to a transportation carrier when a specified event occurs.

55. The system for managing objects of claim 54, wherein the specified event is a failure to detect the tag within a predefined period of time.

56. The system for managing objects of claim 54, wherein the specified event is locating the tag after a failure to detect the tag within a predefined period of time.

57. The system for managing objects of claim 54, wherein the specified event is detection of the tag by a specified reader.

58. The system for managing objects of claim 54, further comprising a representative of the transportation carrier that conveys a status of the tag to the traveler.

59. The system for managing objects of claim 34, wherein the baggage management system is configured for communicating with at least one transportation entity to facilitate locating the tag.

60. The system for managing objects of claim 59, wherein the server is configured for notifying the baggage management system when the tag has been located.

61. A method for tracking the status of an object, comprising:
  registering travel information associated with a traveler in a central database, wherein the travel information is associated with an identification tag attached to an object that is associated with the traveler;

monitoring the location of the object by detecting when the identification tag passes by one or more checkpoints located between an origin location where the object is dropped off by the traveler, and a destination location where the object is loaded onto a transportation vehicle; and automatically initiating a locating process with a central server when the central server recognizes that the location tag has not passed through at least one of the one or more checkpoints within a predetermined amount of time, wherein the locating process includes:

sending a notification message to the traveler from the central server indicating the status of the object's location when a specified event occurs; and sending a notification message to a transportation agent terminal from the central server indicating the status of the object's location.

62. A system for managing the tracking of baggage, comprising:

a travel industry site, comprising:

one or more checkpoints located between an origination location where one or more objects are accepted from a traveler, and a destination location where the one or more objects accepted from the travelers are intended to be directed to, wherein the one or more checkpoints, the origination location and the destination location include identification tag detectors for detecting when a identification tag attached to the one or more objects is located within a predetermined distance of the respective detector;

a central server including a central database for storing:

registration information associated with the traveler and the identification tag attached to the one or more objects, and location information associated with each checkpoint;

wherein each of the one or more checkpoints are configured to send location information to the central server for storage into the central database when the respective checkpoint detects the identification tag within a predetermined distance of a location tag detector, wherein the central server automatically initiates a locating process when the central server determines that one of the one or more checkpoints do not detect the identification tag within a predetermined amount of time, wherein the central server is configured for interfacing with at least one baggage management system for performing the locating process, and wherein the locating process includes generating a travel status message with the central server that indicates the status of the location of the one or more objects when a specified event occurs, and generating a travel industry message with the central server that indicates the status of the location of the one or more objects including the last checkpoint the identification tag was detected.

63. The system for claim 62, further including:

a voice message generator that generates voice messages that indicate the destination location associated with the one or more objects, wherein the voice messages are presented to a communications device associated with an object handler that is responsible for directing the one or more objects to the proper destination location.

64. The system for claim 62, wherein the baggage management system is configured for communicating with at least one transportation entity to facilitate locating the tag.

65. The system for claim 64, wherein the central server is configured for notifying the baggage management system when the tag has been located.

* * * * *